(12) United States Patent
Mollichelli et al.

(10) Patent No.: US 9,038,044 B2
(45) Date of Patent: *May 19, 2015

(54) CODE PATCHING FOR NON-VOLATILE MEMORY

(71) Applicant: Micron Technology Inc., Boise, ID (US)

(72) Inventors: Massimiliano Mollichelli, Milan (IT); Andrea Martinelli, Nembro (IT); Stefan Schippers, Verona (IT)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,054

(22) Filed: Dec. 5, 2013

(65) Prior Publication Data

US 2014/0095774 A1     Apr. 3, 2014

Related U.S. Application Data

(63) Continuation of application No. 12/956,660, filed on Nov. 30, 2010, now Pat. No. 8,607,210.

(51) Int. Cl.
   *G06F 9/45* (2006.01)
   *G06F 12/02* (2006.01)
   *G06F 9/445* (2006.01)

(52) U.S. Cl.
   CPC .............. *G06F 12/0246* (2013.01); *G06F 8/66* (2013.01)

(58) Field of Classification Search
   None
   See application file for complete search history.

(56) References Cited

U.S. PATENT DOCUMENTS

| | | | |
|---|---|---|---|
| 5,635,873 A | 6/1997 | Thrower et al. | |
| 5,790,856 A * | 8/1998 | Lillich | 717/163 |
| 6,021,079 A * | 2/2000 | Worley | 365/225.7 |
| 6,158,018 A | 12/2000 | Bernasconi et al. | |
| 6,279,153 B1 * | 8/2001 | Bi et al. | 717/171 |
| 6,594,821 B1 * | 7/2003 | Banning et al. | 717/136 |
| 8,156,486 B2 | 4/2012 | Hsu et al. | |
| 2002/0167829 A1 * | 11/2002 | Friedman et al. | 365/50 |
| 2002/0196659 A1 | 12/2002 | Hurst et al. | |
| 2004/0010782 A1 | 1/2004 | Moritz | |
| 2004/0015627 A1 | 1/2004 | Desoli et al. | |
| 2004/0125653 A1 * | 7/2004 | Tran et al. | 365/185.22 |
| 2004/0199716 A1 * | 10/2004 | Kawasaki et al. | 711/105 |
| 2006/0107104 A1 | 5/2006 | Alexandre et al. | |
| 2006/0242383 A1 * | 10/2006 | Chen et al. | 711/202 |
| 2007/0006314 A1 | 1/2007 | Costa et al. | |
| 2007/0083713 A1 | 4/2007 | Torrini et al. | |
| 2007/0198787 A1 | 8/2007 | Jessani et al. | |
| 2008/0140899 A1 * | 6/2008 | Oh et al. | 710/300 |
| 2008/0263533 A1 * | 10/2008 | Huque et al. | 717/168 |
| 2008/0274585 A1 * | 11/2008 | Lung et al. | 438/102 |
| 2008/0298810 A1 * | 12/2008 | Crosby et al. | 398/135 |
| 2009/0055621 A1 * | 2/2009 | Nakanishi et al. | 711/202 |

(Continued)

OTHER PUBLICATIONS

Accurately modeling speculative instruction fetching in trace-drive simulation; Author: Ravi Bhargava et; Source: IEEE; Dated: 1999.

*Primary Examiner* — Chameli Das
(74) *Attorney, Agent, or Firm* — Knobbe, Martens, Olson & Bear LLP

(57) ABSTRACT

Example embodiments described herein may comprise a transfer of firmware execution within a non-volatile memory device to one or more replacement instructions at least in part in response to a match between a code fetch address and an address stored in a trap address register.

20 Claims, 5 Drawing Sheets

(56) References Cited

U.S. PATENT DOCUMENTS

| | | |
|---|---|---|
| 2009/0109725 A1* | 4/2009 | Schulte et al. ............... 365/96 |
| 2009/0237984 A1 | 9/2009 | Porter |
| 2009/0300590 A1 | 12/2009 | Moritz |
| 2010/0091561 A1* | 4/2010 | Lowrey et al. ............. 365/163 |
| 2010/0131934 A1 | 5/2010 | Kim et al. |
| 2010/0180083 A1* | 7/2010 | Lee et al. .................. 711/128 |
| 2010/0202195 A1* | 8/2010 | Ramani et al. ............. 365/163 |
| 2010/0270593 A1* | 10/2010 | Lung et al. ................ 257/208 |
| 2010/0287333 A1* | 11/2010 | Lee et al. .................. 711/103 |
| 2011/0116299 A1 | 5/2011 | Obayashi |
| 2011/0173412 A1 | 7/2011 | Tabei et al. |
| 2011/0173593 A1 | 7/2011 | Arimilli et al. |
| 2011/0289263 A1* | 11/2011 | McWilliams et al. ........ 711/103 |
| 2012/0011493 A1 | 1/2012 | Singh et al. |
| 2012/0032136 A1* | 2/2012 | Redaelli et al. ............. 257/5 |
| 2013/0035099 A1* | 2/2013 | Boejer et al. ............... 455/436 |

* cited by examiner

CODE PATCHING FOR NON-VOLATILE MEMORY

CROSS-REFERENCE TO RELATED APPLICATION

This application is a continuation of U.S. patent application Ser. No. 12/956,660, filed Nov. 30, 2010, titled CODE PATCHING FOR NON-VOLATILE MEMORY, the disclosure of which is incorporated herein by reference in its entirety. In addition, any and all applications for which a foreign or domestic priority claim is identified in the Application Data Sheet as filed with the present application are hereby incorporated by reference under 37 C.F.R. §1.57.

BACKGROUND OF THE INVENTION

Subject matter disclosed herein may relate to non-volatile memory devices, and may relate more particularly to code patching for non-volatile memory devices.

Non-volatile memory devices may be found in a wide range of electronic devices. In particular, non-volatile memory devices may be used in computers, digital cameras, cellular telephones, personal digital assistants, etc. Non-volatile memory devices may comprise a controller to manage access operations to an array of non-volatile memory cells. To manage memory array access operations, a non-volatile memory device controller may execute firmware instructions stored in a read-only memory located in the non-volatile memory device. Firmware instructions may be programmed into a non-volatile memory device read-only memory during manufacturing, in at least some circumstances.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
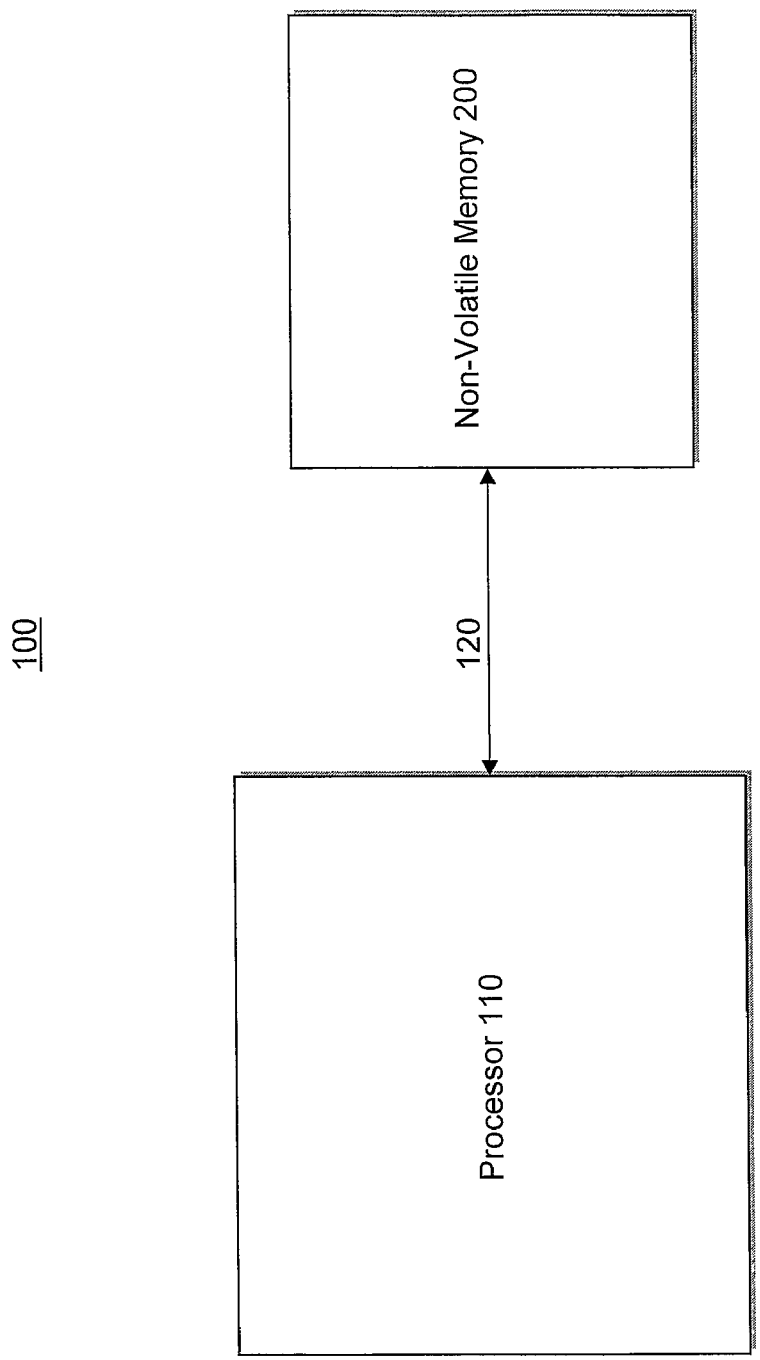
FIG. 1 is a schematic block diagram illustrating an example embodiment of a computing platform.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized. Furthermore, structural or logical changes may be made without departing from the scope of claimed subject matter. It should also be noted that directions or references, for example, up, down, top, bottom, and so on, may be used to facilitate discussion of the drawings and are not intended to restrict the application of claimed subject matter. Therefore, the following detailed description is not to be taken to limit the scope of claimed subject matter or their equivalents.

DETAILED DESCRIPTION OF THE PREFERRED EMBODIMENT

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

As mentioned above, non-volatile memory devices may be found in a wide range of electronic devices. In particular, non-volatile memory devices may be used in computers, digital cameras, cellular telephones, personal digital assistants, etc. As further mentioned above, non-volatile memory devices may comprise a controller to manage access operations to an array of non-volatile memory cells. Non-volatile memory devices may implement functions ranging from simple to complex by use of a controller. For one or more embodiments, a controller may comprise a microcontroller. A potential advantage of utilizing a microcontroller and associated firmware code may comprise relatively easy changes or fine tuning of memory device behavior. For example, new functions may be added to a non-volatile memory device's capabilities by altering firmware code. In some cases, the time and expense of a memory device redesign may be avoided through alteration of firmware code.

In some cases, non-volatile memory device controller firmware may be stored in a read-only memory (ROM) array located in the non-volatile memory device. In such a situation, an alteration to firmware code may require a contact mask change in the manufacturing flow. Clearly, such a solution may incur relatively high expense, and further it may prove difficult to implement more frequent changes to firmware code, if such frequent changes were desired.

An example type of non-volatile memory device may comprise a phase change memory (PCM) device, for an example embodiment. Phase change memory devices may be characterized at least in part by how information is stored in individual memory cells in that a state of a particular memory cell depends on a state of the memory cell material. An amorphous, non-crystalline state may represent a binary value of '0', also referred to as a "reset" state, and a crystalline state of the memory cell may represent a binary value of '1', also referred to as a "set" state. In a phase change memory, whether a memory cell is set or reset may depend, at least in part on a magnitude and shape of a current pulse applied to the memory cell.

For a phase-change memory (PCM) device, data stored in PCM memory cells may not be retained if exposed to types of thermal cycles typically required for packaging and soldering PCM memory devices. Therefore, in some situations, a mask ROM array may be utilized to store firmware code for the PCM memory device controller. However, as mentioned above, in order to alter firmware stored in a ROM array, changes to the memory device's manufacturing process may be required.

Example embodiments described herein may provide efficient techniques for altering firmware code, also referred to as "code patching", without incurring the time or expense of a mask change in a manufacturing process. PCM memory cells, although typically reprogrammable, may be permanently fixed in a substantially non-conductive state by application of an appropriate write pulse. This substantially non-conductive state may remain intact during packaging and soldering operations during manufacturing. In this matter, PCM memory cells may be utilized as "fuse" elements, and may be utilized to store firmware code without the need of a contact mask in a manufacturing process. In an example embodiment, a ROM array may be utilized to store initial firmware code, and PCM cell fuse elements may be utilized to store changes to the initial firmware code. Such changes may be referred to as replacement code or replacement instructions, as described below. Although embodiments described herein may utilize PCM memory cells for code patched operations, claimed subject matter is not limited in scope in this respect. Other embodiments may utilize other types of memory to store firmware code, for example.

FIG. 1 is a block diagram of an example embodiment of a computing platform 100, comprising a processor 110 and a non-volatile memory 200. For the present example, non-volatile memory device 200 comprises a PCM memory device, although the scope of claimed subject matter is not limited in this respect. Memory 200 for this example is coupled to processor 110 by way of a parallel interconnect 120, although again, the scope of claimed subject matter is not limited in this respect. Also for an embodiment, processor 110 may fetch instructions stored in an array of PCM memory cells in memory 200, and processor 110 may execute the fetched instructions. Data may also be written to and/or read from the PCM memory cell array by processor 110. A controller within non-volatile memory 200 executing firmware stored within non-volatile memory 200 may be utilized to implement read or write accesses to the PCM memory array, in accordance with one or more command codes received from processor 110. For the present example, the configuration of computing platform 100 may comprise an execute-in-place (XiP) implementation, wherein processor 110 fetches instructions directly from long-term memory, comprising non-volatile memory device 200 for this example. An example of a non-XiP implementation may comprise a processor fetching temporarily stored instructions from a volatile memory device, such as a dynamic random access memory (DRAM).

The term "computing platform" as used herein refers to a system or a device that includes the ability to process or store data in the form of signals. Thus, a computing platform, in this context, may comprise hardware, software, firmware or any combination thereof. Computing platform 100, as depicted in FIG. 1, is merely one such example, and the scope of claimed subject matter is not limited in these respects. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, and so on. Further, unless specifically stated otherwise, a process as described herein, with reference to flow diagrams or otherwise, may also be executed or controlled, in whole or in part, by a computing platform. For the example embodiments described herein, computing platform 100 may comprise a cellular telephone, although again, the scope of claimed subject matter is not so limited.

Figure 2:
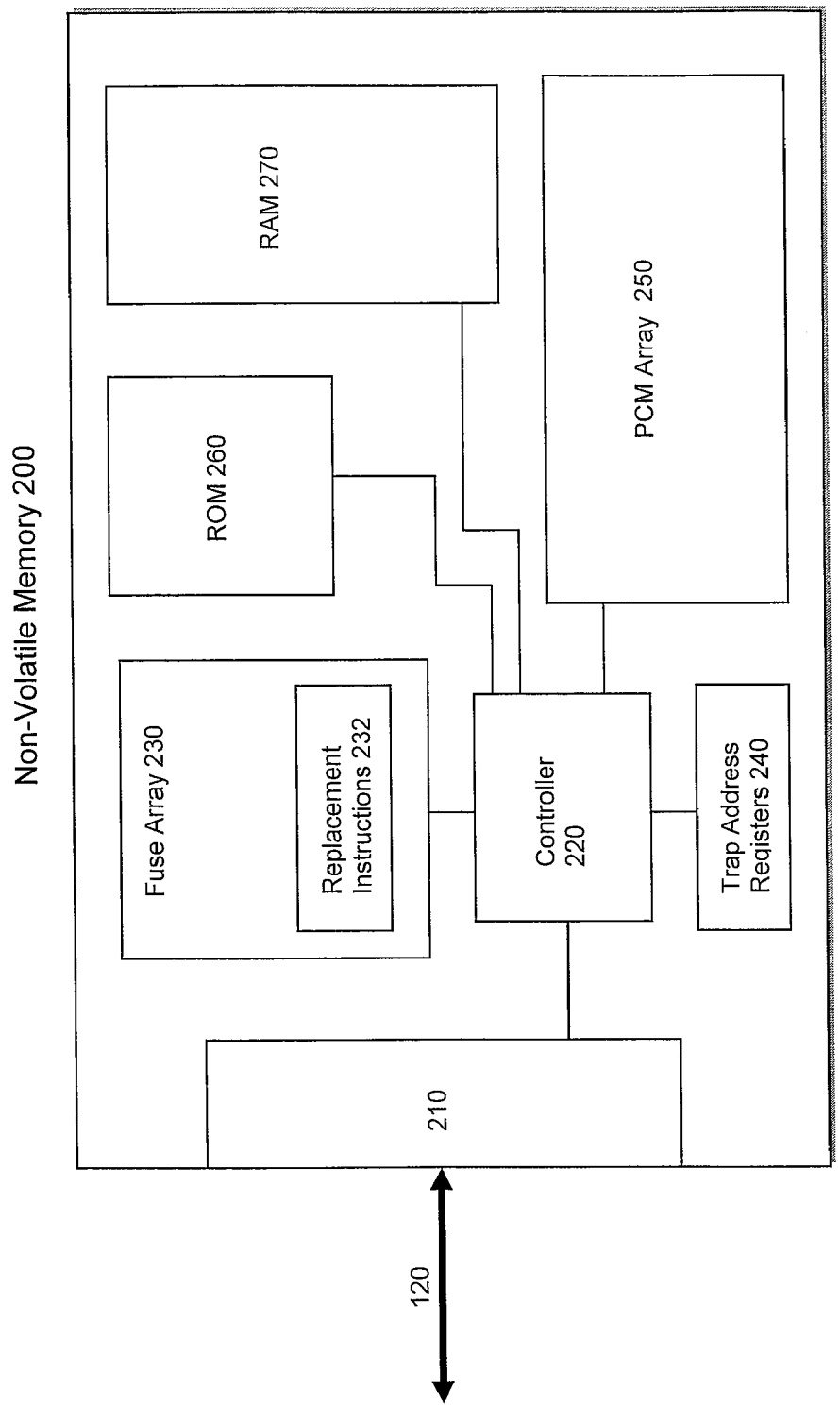
FIG. 2 is a schematic block diagram depicting an example embodiment of a non-volatile memory device.

FIG. 2 is a schematic block diagram depicting an example embodiment of non-volatile memory device 200 including an interconnect interface 210 to receive one or more control signals or command codes from processor 110, for an example. For one or more embodiments, a controller 220 may receive the one or more control signals or command codes from processor 110 via interconnect 120 and interface 210, and may generate one or more internal control signals to perform any of a number of operations, including data read and/or write operations, by which processor 110 may access PCM 250, for example. As used herein, the term "controller" is meant to include any circuitry or logic involved in the management and/or execution of command sequences as they relate to non-volatile memory devices. The term "controller" further refers to an ability to execute firmware instructions as part of the management and/or execution of command sequences.

Non-volatile memory 200 for this example embodiment may further comprise a fuse array 230 that may be utilized to store one or more replacement instructions 232. The term "replacement instruction" refers to an instruction that may be executed by a processor or controller in a non-volatile memory device in place of one or more instructions hard-wired or stored in one-time-programmable or other non-volatile memory locations within the non-volatile memory device. Replacement instructions 232 may be utilized, in an embodiment, to replace a portion of firmware code, as described further below. Replacement instructions 232 may also be referred to herein as replacement firmware code. In an embodiment, fuse array 230 may comprise an array of PCM memory cells, although the scope of claimed subject matter is not limited in this respect.

Non-volatile memory 200 for an embodiment may also comprise a read-only memory array 260, a random access memory array 270, and one or more trap address registers 240. In an embodiment, firmware code may initially be stored in ROM 260 as part of a manufacturing process, although the scope of claimed subject matter is not limited in this respect.

Although PCM cells may be utilized as fuse elements, and although data or code stored in such fuse elements may not be disturbed during packaging and soldering operations in a manufacturing process, PCM memory cells may in some situations be too large to allow the implementation of fuse arrays large enough to store all of the firmware code and possible replacement code for a memory device such as non-volatile memory device 200. Therefore, in one or more embodiments, fuse array 230, implemented as PCM cells, may be utilized to store variations to initial firmware that may be stored in ROM array 260 during manufacturing. Fuse array 230 may also be utilized to store addresses that may be copied into one or more trap address registers 240, as discussed further below. Further, because access times for fuse array 230 may be too slow to maintain desirable performance characteristics for non-volatile memory 200, replacement instructions 232 may be copied from fuse array 230 to RAM 270, so that controller 220 may fetch replacement instructions 232 from RAM 270, which would typically provide faster access times than a fuse array.

Figure 3:
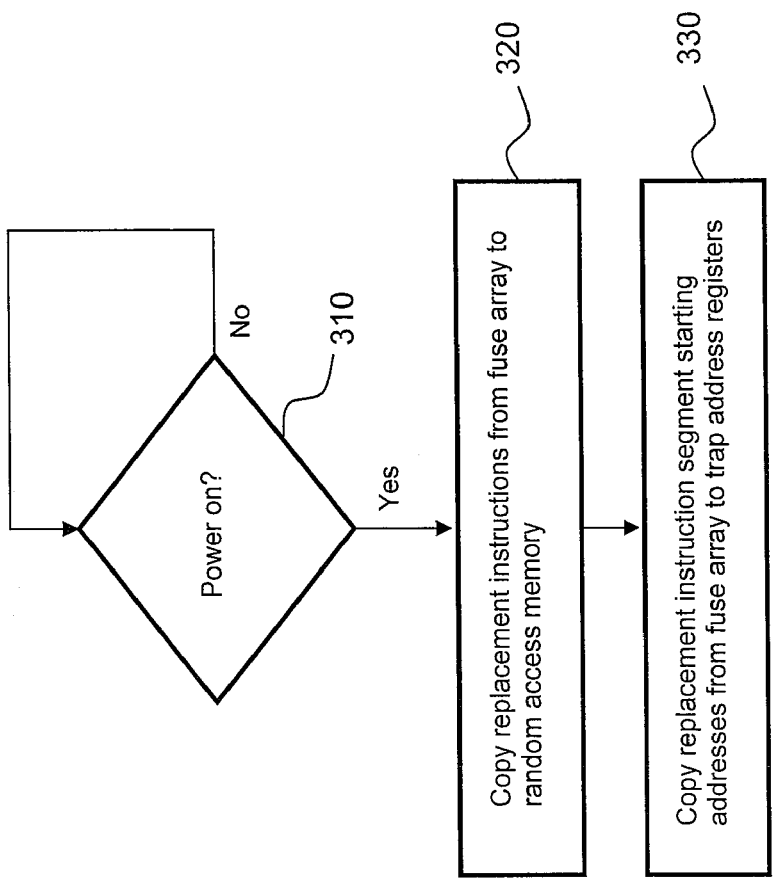
FIG. 3 is a flow diagram of an example embodiment of a process to copy replacement firmware instructions from a fuse array to a random access memory array.

FIG. 3 is a flow diagram of an example embodiment of a process to copy replacement firmware instructions from a fuse array to a random access memory array. At block 310, a power-on condition may be detected. At least in part in response to a detection of a power-on condition, replacement instructions may be copied from a fuse array to a random access memory at block 320. For example, referring again to FIG. 2, replacement instructions 232 may be copied from fuse array 230 to RAM 270. Further, at block 330, starting addresses for one or more replacement code segments or blocks may be copied from a fuse array to one or more trap address registers.

In an embodiment, trap address registers 240 depicted in FIG. 2 may comprise eight trap address registers, and may also comprise eight vector address registers associated with the eight trap address registers, respectively. In an embodiment, the vector address registers may store vector addresses that point to locations in random access memory where a controller may fetch a next firmware code in the event of a trap address match. Fuse array 230 may also comprise eight fuse registers to store up to eight microcontroller addresses and eight associated vector addresses. In an embodiment, the fuse registers and trap address registers 240 may individually comprise a number of bits equal to a number of bits required to reflect controller 220 address space. Also in an embodiment, fuse array 230 may further comprise one hundred twelve fuse registers to store replacement firmware instructions that may be executed instead of the initial firmware code stored in ROM 260 whenever a next address to be fetched by controller 220 matches an address stored in one of trap address registers 240. Although specific amounts and sizes of trap address registers and fuse registers are discussed herein, the scope of claimed subject matter is not limited in these respects.

Figure 4:
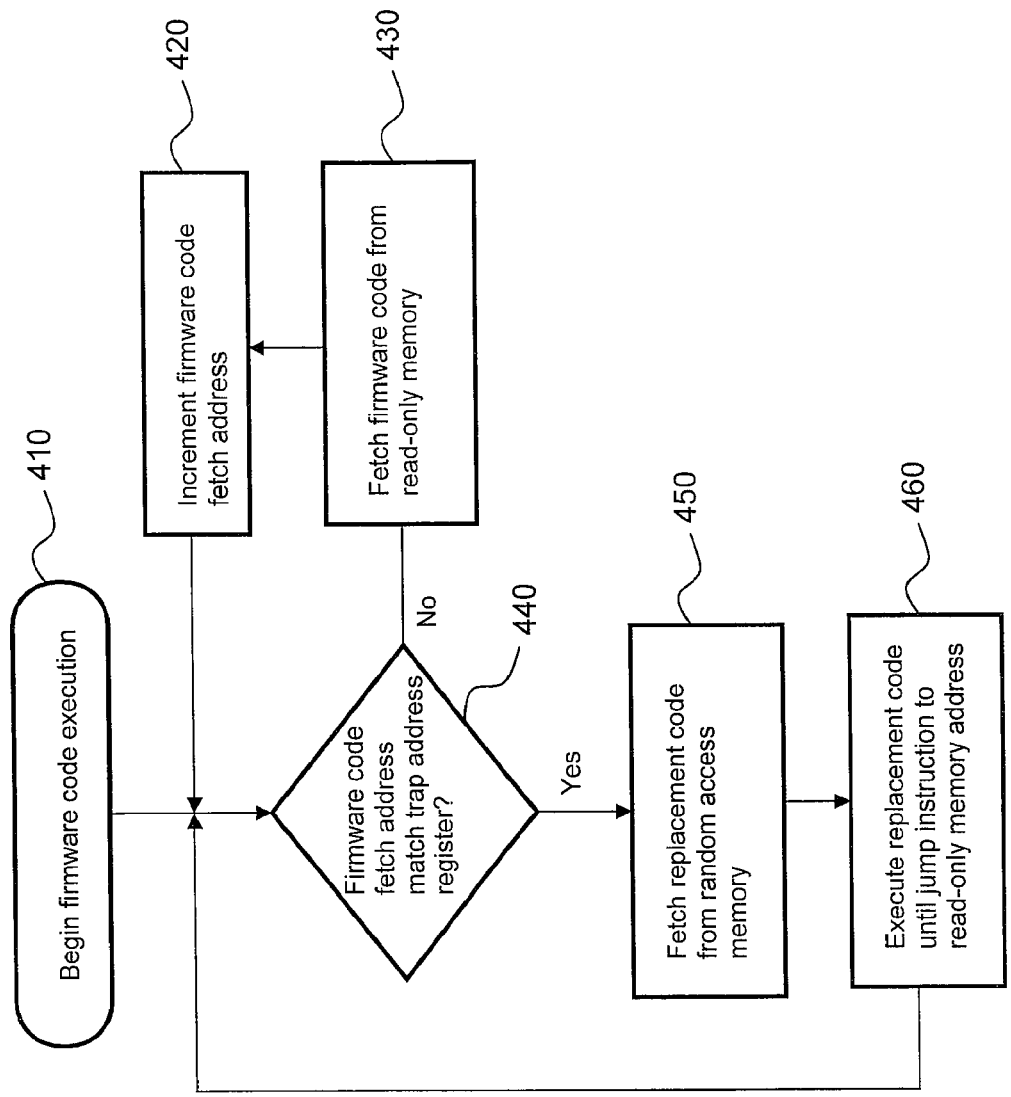
FIG. 4 is a flow diagram of an example embodiment of a process to fetch replacement firmware instructions from a random access memory array.

FIG. 4 is a flow diagram of an example embodiment of a process to fetch replacement firmware instructions from a random access memory array after such replacement firmware instructions are copied from a fuse array to random access memory. At block 410, firmware execution by a microcontroller, such as controller 220 depicted in FIG. 2, may begin. A determination may be made at block 440 as to whether a firmware code fetch address, representing an address for the next firmware instruction to be fetched by the controller, matches any of the addresses stored in a trap address register, such as trap address register 240, in an example embodiment. In the event there is no match determined, at block 430 firmware code may be fetched by the controller from the specified address from a read-only memory array, such as ROM 260. A counter in the controller may be incremented, representing an increment of the firmware code fetch address, and another determination may be made at block 440 regarding a match with one of the addresses stored in the trap address registers. In the event of a match, replacement code may be fetched not from the read-only memory, but rather from random access memory, as indicated at block 450. In an embodiment, a jump instruction may be fetched from an address in random access memory associated with the trap address register within which the matching address is stored, and the controller may begin fetching code from an address specified by the jump instruction. The controller may continue to fetch instructions from sequential addresses within random access memory until a jump instruction is reached that directs the controller back to read-only memory, as indicated at block 460. Embodiments in accordance with claimed subject matter may comprise less than, all of, or more than blocks 410-460. Similarly, the order of blocks 410-460 is merely an example order, and the scope of claimed subject matter is not limited in this respect.

Figure 5:
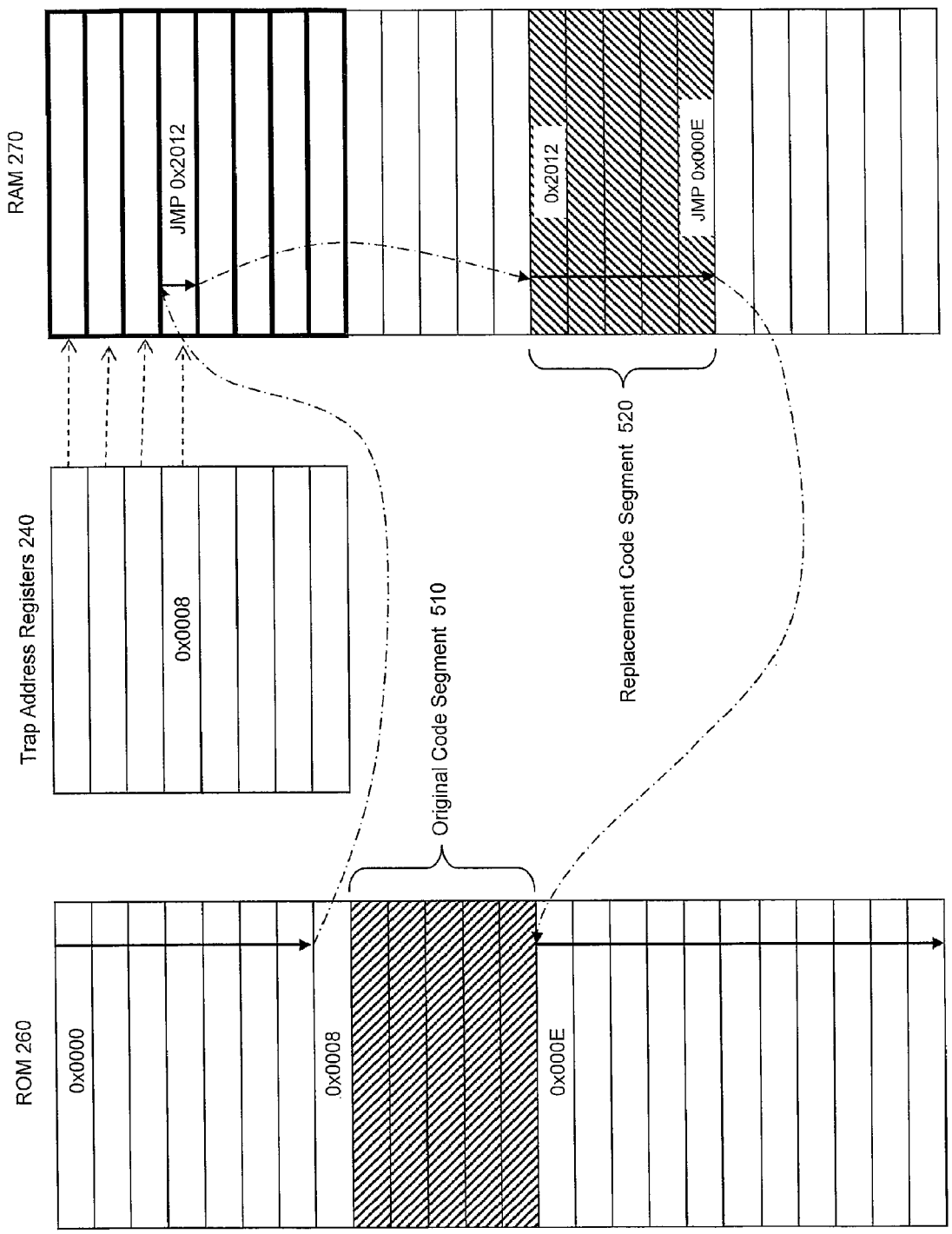
FIG. 5 is a diagram depicting an example process for fetching firmware code from read-only memory and for fetching replacement firmware code from random access memory.

FIG. 5 is a diagram depicting an example process for fetching firmware code from read-only memory and for fetching replacement firmware code from random access memory. The example of FIG. 5 provides a particular example in connection with example embodiments described above. However, it should be noted that the scope of claimed subject matter is not limited to the specific examples depicted and described. FIG. 5 depicts a number of address locations for ROM 260 and RAM 270. Also, eight trap address registers 240 are depicted. Of course, claimed subject matter is not limited to the specific amounts or configurations of the memories and registers depicted. Additionally, for an example embodiment, contents of trap address registers 240 and RAM 270 may be loaded at least in part in response to a detection of power-on condition. In an example embodiment, contents of trap address registers 240 and RAM 270 may, at least in part, be copied from fuse array 230.

As mentioned above, once information stored in fuse array 230 is copied to RAM 270 or to trap address registers 240, as appropriate, controller 220 may begin fetching and executing firmware instructions. As depicted in FIG. 5, controller 220 may begin fetching instructions from example address 0x0000 in ROM 260. For each new firmware code fetch address, a comparison may be made between the addresses stored in trap address register 240 and the current firmware code fetch address. For the example depicted in FIG. 5, the comparisons do not yield a match until the controller seeks to fetch firmware code from example address 0x0008. In an embodiment, at least in part in response to the determination of a match between a current firmware code fetch address and an address stored in one of the trap address registers 240, controller 220 may fetch an instruction from an address within RAM 270 associated with the particular trap address register within which the matching address is stored. For the example of FIG. 5, the corresponding storage location within RAM 270 has stored therein a jump (JMP) instruction indicating an address of 0x2012. At least in part in response to fetching the JMP instruction, controller 220 may begin fetching replacement code segment 520 beginning at address 0x2012. In this manner, controller 220 may execute replacement code segment 520 rather than original code segment 510, stored in ROM 260.

In an embodiment, controller 220 may continue to fetch firmware code from replacement code segment 520 until an additional JMP instructions is reached that instructs controller 220 to begin fetching code from an address located in ROM 260. For the example of FIG. 5, the JMP instruction specifies an example address of 0x000E, which, for the example depicted in FIG. 5, is the next firmware code address following replaced original code segment 510. Controller 220 may continue to fetch and execute firmware code from ROM 260 until another match is found between a firmware code fetch address and an address stored in trap address registers 240.

Although the example depicted in FIG. 5 demonstrates a single replacement code segment 520, the scope of claimed subject matter is not so limited. Embodiments in accordance with claimed subject matter may implement any number of replacement code segments. Further, as mentioned previously, although example embodiments described herein mention specific counts of trap address registers and specific memory configurations, the scope of claimed subject matter is not limited in these respects.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," and "or" as used herein may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method, comprising:
    determining whether a first address of a read-only memory array of a non-volatile memory device matches an address in a first trap address register, wherein the non-volatile memory device further comprises:
        a phase change memory fuse array comprising replacement firmware instructions, wherein the phase change memory fuse array comprises phase change memory cells formed of a memory cell material comprising a crystalline state and an amorphous, non-crystalline state; and
        a random access memory array comprising at least one replacement firmware instruction; and
    fetching the at least one replacement firmware instruction from the random access memory array in response to the first address of the read-only memory array matching the address in the first trap address register.

2. The method of claim 1, further comprising:
    fetching firmware instructions from the read-only memory array in response to a mismatch between the first address of the read-only memory array and the address in the first trap address register.

3. The method of claim 1, further comprising:
    executing the at least one replacement firmware instruction; and
    determining whether a second address of the read-only memory array matches an address in a second trap address register.

4. The method of claim 3, further comprising:
    fetching firmware instructions from the read-only memory array in response to a mismatch between the second address of the read-only memory array and the address in the second trap address register.

5. The method of claim 1, wherein states of individual programmed memory cells of the fuse array do not change with an application of heat during a manufacturing process.

6. The method of claim 1, wherein the non-volatile memory device further comprises a phase change memory array separate from the fuse array.

7. The method of claim 1, further comprising copying replacement firmware instruction from the phase change memory fuse array to the random access memory array.

8. A non-volatile memory device, comprising:
a read-only memory array;
a first trap address register;
a random access memory array comprising at least one replacement firmware instruction; and
a phase change memory fuse array comprising replacement firmware instructions, wherein the phase change memory fuse array comprises phase change memory cells formed of a memory cell material comprising a crystalline state and an amorphous, non-crystalline state; and
a controller configured to:
determine whether a first address of the read-only memory array matches an address in the first trap address register; and
fetch at least one replacement firmware instruction from the random access memory array in response to a match between the first address of the read-only memory array and the address in the first trap address register.

9. The non-volatile memory device of claim 8, the controller further configured to fetch firmware instructions from the read-only memory array in response to a mismatch between the first address of the read only memory array and the address in the first trap address register.

10. The non-volatile memory device of claim 8, the controller further configured to:
execute the at least one replacement firmware instruction; and
determine whether a second address of the read-only memory array matches an address in a second trap address register.

11. The non-volatile memory device of claim 10, the controller further configured to fetch firmware instructions from the read-only memory array in response to a mismatch between the second address of the read-only memory array and the address in the second trap address register.

12. The non-volatile memory device of claim 8, wherein states of individual programmed memory cells of the fuse array do not change with an application of heat during a manufacturing process.

13. The non-volatile memory device of claim 8, wherein the non-volatile memory device further comprises a phase change memory array separate from the fuse array.

14. The non-volatile memory device of claim 8, the controller further configured to copy replacement firmware instruction from the phase change memory fuse array to the random access memory array.

15. A system, comprising:
a processor; and
a non-volatile memory device coupled to the processor, the non-volatile memory device comprising:
a phase change memory fuse array comprising replacement firmware instructions, wherein the phase change memory fuse array comprises phase change memory cells formed of a memory cell material comprising a crystalline state and an amorphous, non-crystalline state;
a random access memory array comprising at least one replacement firmware instruction;
a read-only memory array;
a first trap address register; and
a controller configured to:
determine whether a first address of the read-only memory array matches an address in the first trap address register; and
fetch at least one replacement firmware instructions from the random access memory array in response to a match between the first address of the read-only memory array and the address in the first trap address register;
wherein the at least one replacement firmware instruction is executable by the controller and wherein the controller is configured to perform an access operation to the random access memory array at least partially in response to a memory access command received from the processor.

16. The system of claim 15, wherein the controller is further configured to fetch firmware instructions from the read-only memory array in response to a mismatch between the first address of the read-only memory array and the address in the first trap address register.

17. The system of claim 15, wherein the controller is further configured to:
execute the at least one replacement firmware instruction; and
determine whether a second address of the read-only memory array matches an address in a second trap address register.

18. The system of claim 17, wherein the controller is further configured to fetch firmware instructions from the read-only memory array in response to a mismatch between the second address of the read-only memory array and the address in the second trap address register.

19. The system of claim 15, wherein states of individual programmed memory cells of the fuse array do not change with an application of heat during a manufacturing process.

20. The system of claim 15, wherein the non-volatile memory device further comprises a phase change memory array separate from the fuse array.

* * * * *